UNITED STATES PATENT OFFICE.

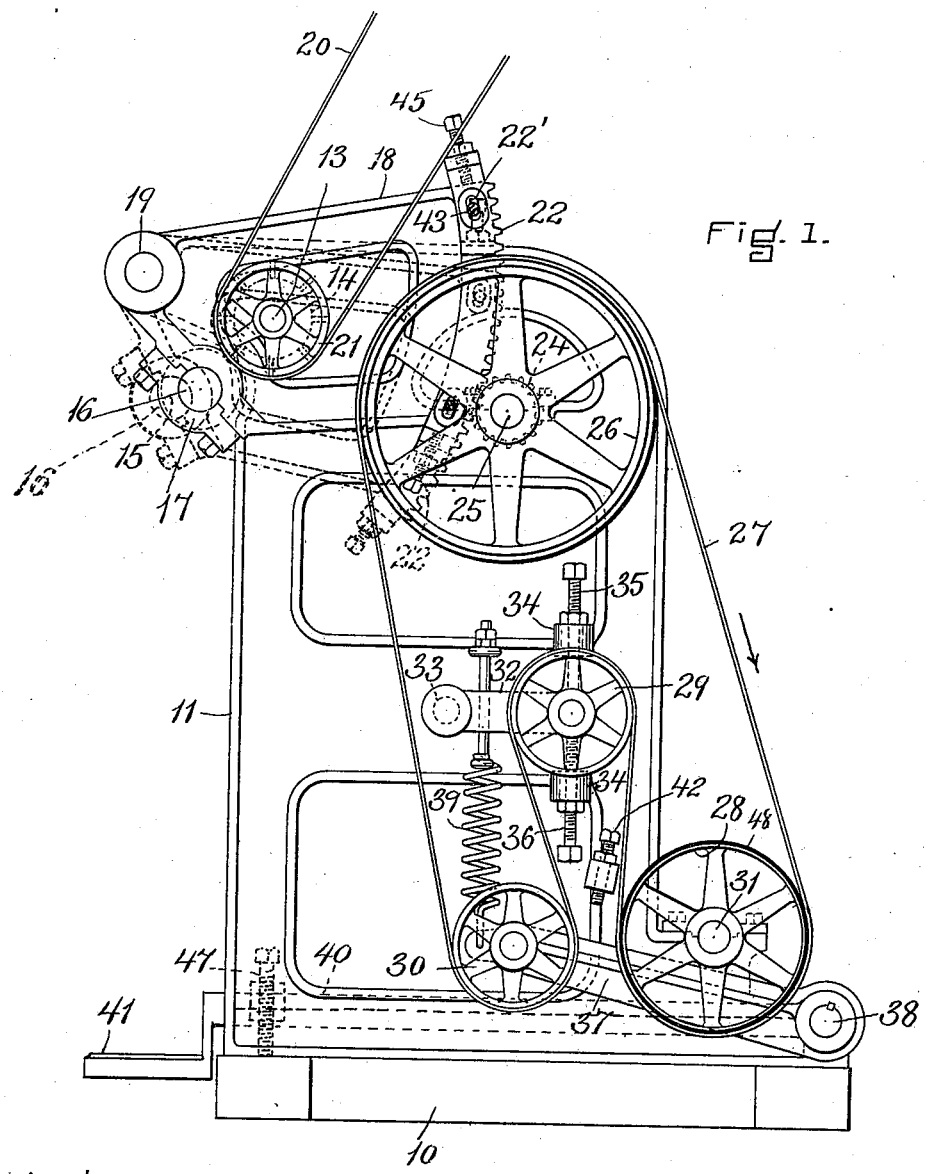

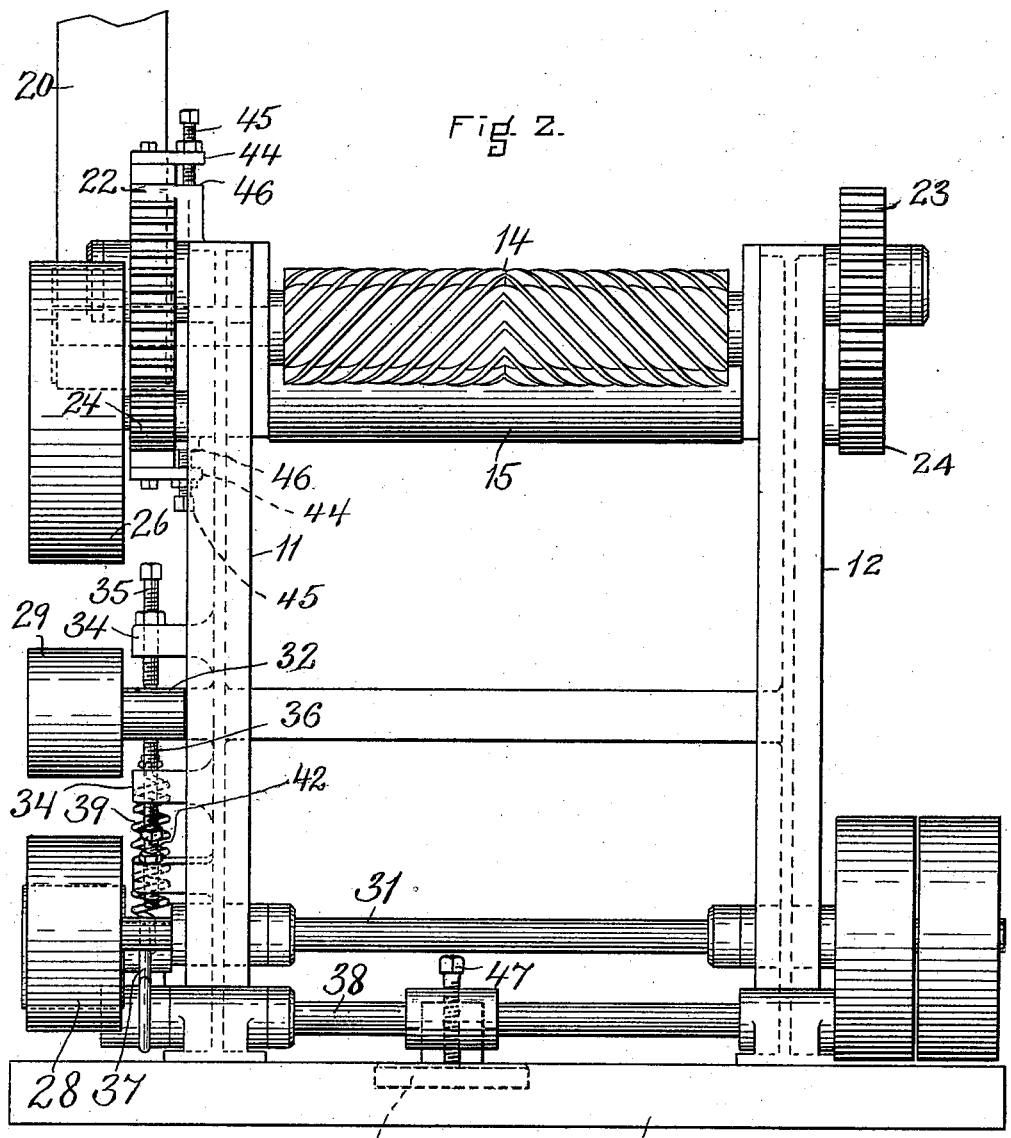

ALEXANDER H. KEHRHAHN, OF FRANKFORT-ON-THE-MAIN, GERMANY.

LEATHER-WORKING MACHINE.

982,007.

Specification of Letters Patent. Patented Jan. 17, 1911.

Application filed May 3, 1910. Serial No. 559,090.

*To all whom it may concern:*

Be it known that I, ALEXANDER H. KEHR-HAHN, a subject of the King of Prussia and Emperor of Germany, residing at Otto-strasse 13, Frankfort-on-the-Main, Prussia, Germany, have invented certain new and useful Improvements in Leather-Working Machines, of which the following is a specification.

This invention relates to machines for operating upon hides, skins, and leather, such as those employed by tanners or curriers for fleshing, scudding, unhairing, shaving, ironing, glazing, or for operating upon the work in any manner by tools such as revolving bladed cylinders, rollers, glasses, or heated irons.

The invention consists in friction driven mechanism and manually operative means for controlling the friction mechanism, in combination with relatively movable coacting members for operating upon the work with pressure.

The purpose of the invention is to provide power driven mechanism for effecting relative movement and pressure of the coacting work-engaging members, whereby the relative movement, controlled by the manually operative means, may be begun, continued, interrupted, resumed, or reversed, and whereby the pressure of said members may be begun, continued, increased, decreased, or relieved, at any time, and for any length of time, at the will of the operator.

For purposes of illustration the invention in the embodiment shown by the accompanying drawings is combined with a shaving machine which includes a bladed cylinder. The machine also includes a bed roll which is movable bodily toward and from the bladed cylinder, and which is adapted to press the work with more or less pressure against the cylinder. The bed roll is capable of sufficient movement to facilitate the insertion of the work, and the present invention is embodied in mechanism for causing the bed roll and bladed cylinder to coact upon the work with variable pressure.

For the purposes mentioned the invention includes friction driving mechanism under the control of the operator for exerting variable tension tending to move one of said coacting members toward the other. Motive power for causing such movement is not derived from the operator, but may be derived from any appropriate source of power such as a pulley. The friction element included in the actuating mechanism may be controlled by the operator so that the movable member which engages the work may be caused to coact with more or less pressure with the complemental member. In the form illustrated the controlling means consists of a treadle, and it is so related to the friction mechanism that an increase of pressure upon the treadle effects an increase of friction, and consequently a relatively great increase of pressure of the work-engaging members upon the work.

One advantage afforded by the invention is that any desired length of movement of the bed roll may be had without requiring an appreciable movement of the treadle. Another advantage is that a relatively great pressure of the work-engaging members may be effected by a relatively slight pressure upon the treadle. So long as the pressure upon the treadle is sufficient the pressure of the work-engaging members is continuous, but the pressure of the work-engaging members may be varied by a slight variation of pressure upon the treadle. The work-engaging members in the form illustrated are arranged so that they may become separated solely by reason of gravity when the pressure upon the treadle ceases, but this is not essential.

Of the accompanying drawings forming a part of this specification, Figure 1 represents a side elevation of a shaving machine embodying one form of the present invention. Fig. 2 represents a front elevation thereof.

The same reference characters indicate the same parts wherever they occur.

On the drawings a machine base is indicated at 10 and two members of the supporting frame are indicated at 11 and 12. The frame members are provided with stationary bearings for a shaft 13, which carries a tool such as a bladed cylinder 14. A bed roll is indicated at 15 and is mounted so as to be movable toward and from the cylinder 14. The bed roll is mounted upon a shaft 16, whose ends are mounted in bearings 17 in an oscillatory frame 18. The frame 18 is mounted upon a shaft or pivots 19, supported by the frame members 11 and 12. So far as the present invention is concerned it is immaterial whether the bed roll moves toward and from the bladed cylinder, or whether the bladed cylinder moves toward and from the bed roll, or whether the bed roll and cylinder both have movement toward and from each other.

The normal position of the movable frame 18 is shown by dotted lines in Fig. 1. When the frame is in this position the bed roll 15 is relatively distant from the cylinder 14 and ample space is thus provided for insertion of the work. After the work has been inserted between the bed roll and the bladed cylinder the bed roll is moved toward the cylinder so as to press the work against the blades of the cylinder which is continuously rotated to cause the blades to act upon the work. Rotation may be imparted to the cylinder by a belt 20 and pulley 21 affixed upon shaft 13 of the cylinder.

The mechanism thus far described is not new, and does not form any part of the present invention, but the invention is embodied in the means hereinafter described for moving the bed roll toward the cylinder.

The frame 18 which supports the bed roll is provided with gear segments 22 and 23 respectively. These segments are intermeshed with pinions 24 affixed upon a shaft 25. The shaft is mounted in fixed bearings in the frame members 11 and 12 and is provided with a pulley 26. An endless belt 27 passes over the pulley 26 and also over a driving pulley 28 and idle pulleys 29 and 30. The driving pulley 28 is affixed upon a shaft 31 mounted in fixed bearings in the frame members 11 and 12. The pulley 29 is carried at the free ends of an arm 32, pivoted at 33, and may be adjusted to compensate for variation in the length of the belt 27. For this reason the frame member 11 is provided with bosses 34 in which oppositely disposed adjusting screws 35 and 36 are threaded. The adjusting screws are arranged to engage the free end of the arm 32 and to lock said arm positively in the desired position. The pulley 30 is mounted at the free end of an arm 37 keyed or otherwise affixed upon a rock-shaft 38. The arm 37 is connected to a spring 39 which exerts its tension tending to relax the tension of the belt 27. A lever 40 is affixed to the shaft 38 and is provided with a treadle 41.

The upward movement of the arm 37 due to the tension of the spring 39 may be limited by an adjustable stop 42 attached to the frame member 11. The gear segment 22 is here shown as being adjustable with relation to its movable frame 18, the object being to cause the pinions 24 to act equally upon the segments 22 and 23. For this purpose the segment 22 is provided with concentric slots 22', and the frame 18 is provided with clamping studs 43 which extend through the slots 22'. The segment 22 is further provided with ears 44 (see Fig. 2) in which are threaded a pair of oppositely disposed adjusting screws 45, said screws abutting against surfaces 46 of the frame 18 to position the segment rigidly with relation to said frame.

The machine thus constructed may be operated in the following manner: After the introduction of the work between the bed roll 15 and the bladed cylinder 14 the bed roll may be moved toward the cylinder by depressing the treadle 41. It is proposed to cause the driving pulley 28 to be rotated continuously and to thereby keep the belt 27 constantly in motion in the direction indicated by the arrow in Fig. 1. Because of the initially relaxed condition of the belt it may slip over the pulley 26 without driving the latter. It will be observed that the belt engages approximately 180° of the rim of the pulley 26 and that it engages considerably more than 180° of the rim of the pulley 28. A slight pressure upon the treadle is sufficient to remove the slack from the belt 27 and cause the belt to exert the requisite friction upon the pulley 26. The pulley 26 may thus be rotated to elevate the bed roll 15, the speed of elevation depending upon the degree of pressure upon the treadle. When the work upon the bed roll is moved into engagement with the cylinder 14 the movement of the bed roll is, of course, arrested but the pressure of the bed roll in the direction of the cylinder continues so long as tension is applied to the belt 27 by downward pressure upon the treadle. The work-engaging members are thus supported in coöperative relation through the medium of a continuously moving belt 27 which continues to slip upon the pulley 26. It is obvious that the pressure of the work-engaging members may be increased or decreased while they remain in coöperative position by varying the downward pressure upon the treadle. The maximum pressure of the work-engaging members may be determined by various means, such as a stop screw 47 threaded in the treadle lever 40. As here shown the stop 47 is arranged to engage the base 10 and thus limit the downward movement of the treadle. The screw 47 may be adjusted to permit more or less movement of the lever 40 and to thereby increase or decrease the maximum tension of the work-engaging members. Upon the completion of an operation the movable frame 18 may be permitted to descend by gravity by relieving the downward pressure upon the treadle.

It is obvious that the belt and pulley 26 constitute coacting friction members of one form of friction clutch inasmuch as they may be caused to slip or to coöperate with any desired degree of friction. In order to insure a greater degree of friction of the belt with the pulley 28 than with the pulley 26 so that the slipping of the belt will be confined to the pulley 26 the rim of the pulley 28 may be covered with friction material 48 such as leather. Any tendency of the belt to slip laterally upon the pulley 26 may be overcome by providing guides (not shown) upon the frame member 11, or by providing flanges (not shown) at the side edges of the pulley.

An advantage of a belt and pulley as a friction clutch, as distinguished from what are termed "cone clutches" and "expanding clutches" is that the friction surface of the belt has sufficient opportunity to cool while passing from one pulley to another. Another advantage is that the friction surface of the belt may be coated with some liquid friction producing substance, the belt being readily accessible for this purpose. Adhesion of the belt with relation to the pulley 26 may thus be increased. A third advantage is precision of tension due to the elasticity of the belt. The pulleys 29 and 30 are movable in direction substantially parallel to the tangent portions of the belt, and therefore a movement of either of said pulleys effects a shortening of the belt commensurate to twice the distance through which the pulleys are moved. Thus a relatively short adjustment of the pulley 29, or a relatively short movement of the treadle effects a relatively great shortening of the belt. It is apparent, however, that a cone clutch, expanding clutch, or any other form of friction clutch may be employed to effect the desired result, and for this reason the term "friction clutch" is intended to include the various forms in which a friction clutch may be embodied.

The arrangement of the pinions 24 and segments 22 is such as to maintain the leverage of the closing force at an equal ratio, as distinguished from other construction and arrangement often employed for this purpose. The meaning of the foregoing statement may better be understood when it is considered that the mechanism now in use for operating machines of this type includes a crank and a connecting rod for transmitting movement to close the work-engaging members. One result of a crank and connecting rod is a constantly changing ratio of leverage, and it is customary to arrange the crank so as to pass over what is sometimes termed the "dead center" when the work-engaging members are closed. When the crank is so arranged, the ratio of leverage is at maximum when the work-engaging members are closed, and, consequently, a relatively slight degree of power is sufficient to move the crank over the dead center. The illustrated arrangement of gears, or any equivalent arrangement by which the leverage of the closing force is maintained at an equal ratio, is preferred because the closing tension of the work-engaging members may be better controlled through the medium of the mechanism provided for that purpose.

Having thus explained the nature of my said invention and described a way of constructing and using the same, although without attempting to set forth all of the forms in which it may be made or all of the modes of its use, what I claim is:—

1. A machine of the character described, comprising a working tool and work support, one movable toward and from the other, a continuously moving member, means having frictional engagement with said continuously moving member for closing said work-engaging members, and independently controllable means for effecting and varying the frictional tension of said continuously moving member on said means.

2. A machine of the character described, comprising two coactive work-engaging members, one of said members being movable toward and from the other, a continuously moving endless belt, means having frictional engagement with said belt for closing said work-engaging members and for maintaining closing tension thereof, and manually operative means for varying the tension of said belt to vary the closing tension of said work-engaging members.

3. A machine of the character described, comprising two coactive work-engaging members, one of said members being movable toward and from the other, a continuously moving member, means having frictional engagement with said continuously moving member for closing said work-engaging members, and for maintaining closing tension thereof, and means including a treadle for varying the frictional tension of said continuously moving member, said treadle means being adapted to effect a relatively great increase of frictional tension by a relatively slight increase of pressure upon the treadle.

4. A machine of the character described, comprising two coactive work-engaging members, one of said members being movable toward and from the other, a continuously moving member, means having frictional engagement with said continuously moving member for closing said work-engaging members, and for maintaining closing tension thereof, means including a treadle for varying the frictional tension of said continuously moving member, and a stop for limiting the movement of said treadle means.

5. A machine of the character described, comprising two coactive work-engaging members, one of said members being movable toward and from the other, a continuously moving endless belt, means having frictional engagement with said belt for closing said work-engaging members, movable means engaging said belt for varying the frictional tension thereof with said closing means, and means engaging said belt for adjusting the length of the belt with relation to said closing means and said tension-varying means.

6. A machine of the character described, comprising two coactive work-engaging members, one of said members being movable toward and from the other, a continuously moving endless belt, means having frictional engagement with said belt for closing said work-engaging members, a treadle, and means actuated by said treadle and engaging said belt for varying the frictional tension of said belt with said closing means, said treadle actuated means being arranged to effect a shortening of the belt commensurate to twice the length of movement of the said treadle actuated means.

7. A machine of the character described, comprising two coactive work-engaging members, one of said members being movable toward and from the other, an endless belt, means having frictional engagement with said belt for closing said work-engaging members and for maintaining closing tension thereof, and a continuously rotating pulley for driving said belt, said pulley having a belt engaging surface composed of friction material adapted to effect continuous driving of the belt.

8. A machine of the character described, comprising two coactive work-engaging members, one of said members being movable toward and from the other, a continuously moving member, a rotatable member having frictional engagement with said continuously moving member and gears connected with said rotatable member for imparting movement to close said work-engaging members, said gears being arranged to be arrested by the work-engaging members when closed.

9. A machine of the character described, comprising two coactive work-engaging members, one of said members being movable toward and from the other, a continuously moving member, a rotatable member having frictional engagement with said continuously moving member, and gears connected with said rotatable member for imparting movement to close said work-engaging members, said gears being connected with one of said work-engaging members so as to maintain the leverage of the closing force at an equal ratio.

In testimony whereof I have affixed my signature, in presence of two witnesses.

ALEXANDER H. KEHRHAHN.

Witnesses:
W. P. ABELL,
P. W. PEZZETTI.